United States Patent
Cho (10) Patent No.: US 11,379,590 B2
(45) Date of Patent: Jul. 5, 2022

(54) MONITORING CIRCUIT, AN OPERATION METHOD OF THE MONITORING CIRCUIT, AND A SEMICONDUCTOR SYSTEM INCLUDING THE SAME

(71) Applicant: SAMSUNG ELECTRONICS CO., LTD., Suwon-si (KR)

(72) Inventor: Dong Sik Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 411 days.

(21) Appl. No.: 16/506,513

(22) Filed: Jul. 9, 2019

(65) Prior Publication Data
US 2020/0110883 A1 Apr. 9, 2020

(30) Foreign Application Priority Data
Oct. 8, 2018 (KR) .......................... 10-2018-0119646

(51) Int. Cl.
*G06F 21/57* (2013.01)
*G06F 1/28* (2006.01)

(52) U.S. Cl.
CPC .............. *G06F 21/577* (2013.01); *G06F 1/28* (2013.01); *G06F 2221/034* (2013.01)

(58) Field of Classification Search
CPC .................................. G06F 21/577; G06F 1/28
See application file for complete search history.

(56) References Cited

U.S. PATENT DOCUMENTS

| 4,131,942 | A | * | 12/1978 | Gillett | G06F 1/28 714/22 |
| 7,100,058 | B1 | * | 8/2006 | Tomlinson | G06F 1/24 324/426 |
| 8,892,903 | B1 | | 11/2014 | Trimberger | |
| 2009/0113238 | A1 | * | 4/2009 | Liu | A61M 16/0051 714/14 |
| 2013/0187456 | A1 | | 7/2013 | Bilhan | |
| 2016/0231799 | A1 | * | 8/2016 | Birnie | G06F 1/28 |
| 2017/0300251 | A1 | | 10/2017 | Kota et al. | |

FOREIGN PATENT DOCUMENTS

| JP | 2000076139 A | 3/2000 |
| JP | 2002229856 A | 8/2002 |
| JP | 2006127648 A | 5/2006 |
| KR | 101826777 B1 | 3/2018 |

* cited by examiner

*Primary Examiner* — Oleg Korsak
(74) *Attorney, Agent, or Firm* — Volentine, Whitt & Francos, PLLC

(57) ABSTRACT

A semiconductor device includes a monitoring circuit receiving a first supply signal and generating a flag signal by monitoring a second supply signal provided to a monitored circuit; a watchdog circuit disposed in the monitoring circuit, receiving the first supply signal, and generating a watchdog signal; and a comparison circuit receiving the flag signal and the watchdog signal and generating a first signal which has a first level under an abnormal condition and a second level under a normal condition. The second level is different than the first level. The watchdog circuit sets the watchdog signal to a third level when the level of the first supply signal is lower than a first reference level. When the watchdog signal has the third level, the comparison circuit allows the first signal to have the first level regardless of the level of the flag signal.

20 Claims, 8 Drawing Sheets

|  | Flag signal (FS) | Watchdog signal (WS) | First, second and third signal (IS, TS, CS) |
|---|---|---|---|
| CASE 1 | Level 1 | Level 3 | Level 5 |
| CASE 2 | Level 1 | Level 4 | Level 5 |
| CASE 3 | Level 2 | Level 3 | Level 5 |
| CASE 4 | Level 2 | Level 4 | Level 6 |

MONITORING CIRCUIT, AN OPERATION METHOD OF THE MONITORING CIRCUIT, AND A SEMICONDUCTOR SYSTEM INCLUDING THE SAME

A claim for priority under 35 U.S.C. § 119 is made to Korean Patent Application No. 10-2018-0119646, filed on Oct. 8, 2018, the entire contents of which are hereby incorporated by reference.

BACKGROUND

The present inventive concepts relate to monitoring circuits, and operation methods of monitoring circuits, and semiconductor systems including the same.

Electronic devices typically include multiple circuits. If signals provided to the multiple circuits of an electronic device are manipulated, security information and the like included in the multiple circuits may be revealed or leaked. For example, if a voltage supplied to a particular circuit is considerably lowered by a malicious attack from the outside for example, the security of the particular circuit may be weakened or compromised, enabling unauthorized access to the particular circuit.

In order to secure and/or ensure the reliability of the security of multiple circuits, signals applied to each of the multiple circuits are typically monitored. However, if an apparatus for monitoring signals applied to each of the multiple circuits is subjected to a malicious attack from the outside, the apparatus may not be able to properly monitor the signals applied to each of the multiple circuits, and as a result reliability of the security of the multiple circuits may not be secured and/or ensured.

SUMMARY

Embodiments of the inventive concepts provide a semiconductor device in which a watchdog circuit is placed in a monitoring circuit so as to secure the reliability of operation and security of a monitored circuit, and a semiconductor system including the semiconductor device.

Embodiments of the inventive concepts also provide a semiconductor device capable of detecting, using a watchdog circuit, a case where reliability of operation and security of a monitoring circuit is lowered, and a semiconductor system including the semiconductor device.

Embodiments of the inventive concepts provided a semiconductor device including a monitoring circuit configured to receive a first supply signal and generate a flag signal by monitoring a second supply signal provided to a monitored circuit; a watchdog circuit disposed in the monitoring circuit, configured to receive the first supply signal and generate a watchdog signal; and a comparison circuit configured to receive the flag signal and the watchdog signal and generate a first signal which has a first level under an abnormal condition and a second level under a normal condition. The second level is different than the first level. The watchdog circuit is configured to set the watchdog signal to a third level when the level of the first supply signal is lower than a first reference level. When the watchdog signal has the third level, the comparison circuit is configured to allow the first signal to have the first level regardless of the level of the flag signal.

Embodiments of the inventive concepts further provide a semiconductor system including a processor receiving first and second supply signals; and a monitored circuit disposed in the processor and driven by the second supply signal. The processor is configured to monitor the first supply signal and generate a watchdog signal having a first level when a level of the first supply signal is lower than a first reference level, monitor the second supply signal and generate a flag signal, and generate an interrupt signal regardless of a level of the flag signal when the watchdog signal has the first level.

Embodiments of the inventive concepts still further provide a semiconductor system including a semiconductor device receiving a first supply signal; and a monitored circuit receiving a second supply signal. The semiconductor device includes a monitoring circuit driven by the first supply signal and configured to generate a flag signal by monitoring the second supply signal, a watchdog circuit configured to generate a watchdog signal having a first level when the level of the first supply signal is lower than a first reference level, and a comparison circuit configured to determine that a current condition is an abnormal condition regardless of the level of the flag signal when the watchdog signal has the first level.

Embodiments of the inventive concepts also provide an operating method of a semiconductor device, including generating, by a monitoring circuit, a flag signal based on a first supply signal provided to a monitored circuit; setting, by a watchdog circuit, a watchdog signal to a first level when the level of a second supply signal provided to the monitoring circuit is lower than a first reference level; setting, by the watchdog circuit, the watchdog signal to a second level when the level of the second supply signal is higher than or the same as the first reference level; and receiving, by a comparison circuit, the flag signal and the watchdog signal and generating, by the comparison circuit, a first signal having a third level under an abnormal condition and having a fourth level under a normal condition. The first signal has the third level regardless of the level of the flag signal when the watchdog signal has the first level.

Embodiments of the inventive concepts provide a semiconductor system including a power management integrated circuit configured to receive first and second supply signals; an application processor configured to receive power from the power management integrated circuit; and a monitored circuit disposed in the power management integrated circuit and driven by the second supply signal. The power management integrated circuit is configured to monitor the first supply signal and generate a watchdog signal having a first level when the level of the first supply signal is lower than a first reference level, monitor the second supply signal and generate a flag signal, and generate an interrupt signal regardless of the level of the flag signal when the watchdog signal has the first level.

Embodiments of the inventive concepts should not be restricted as described above. The above and other embodiments of the inventive concepts will become more apparent to one of ordinary skill in the art to which the inventive concepts pertain by referencing the detailed description of the present disclosure provided hereinafter.

BRIEF DESCRIPTION OF THE DRAWINGS

The above and other embodiments and features of the inventive concepts will become more apparent in view of the following detailed description with reference to the attached drawings, in which.

DETAILED DESCRIPTION

Figure 1:
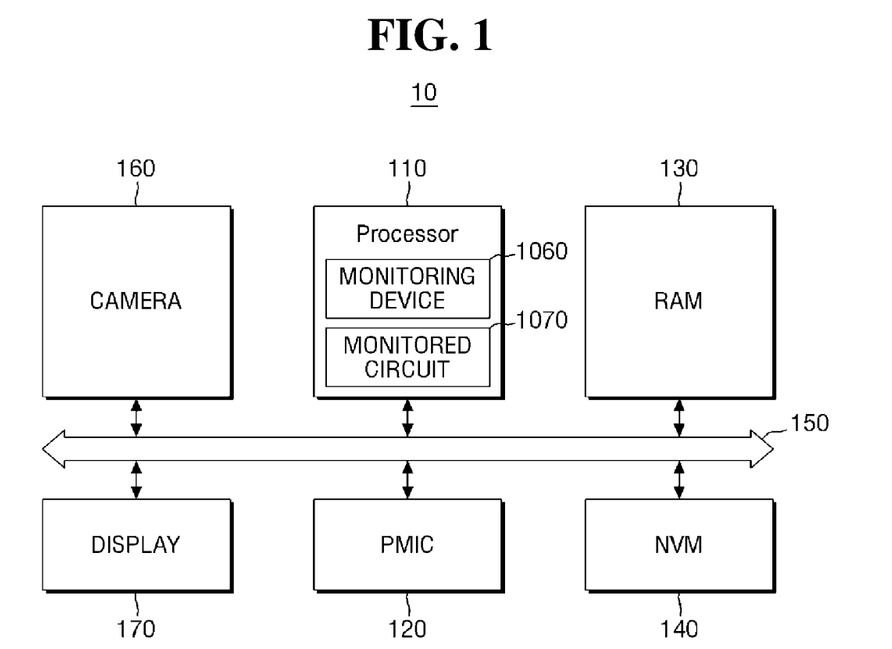
FIG. 1 illustrates a block diagram of a semiconductor system according to embodiments of the inventive concepts.
Figure 2:
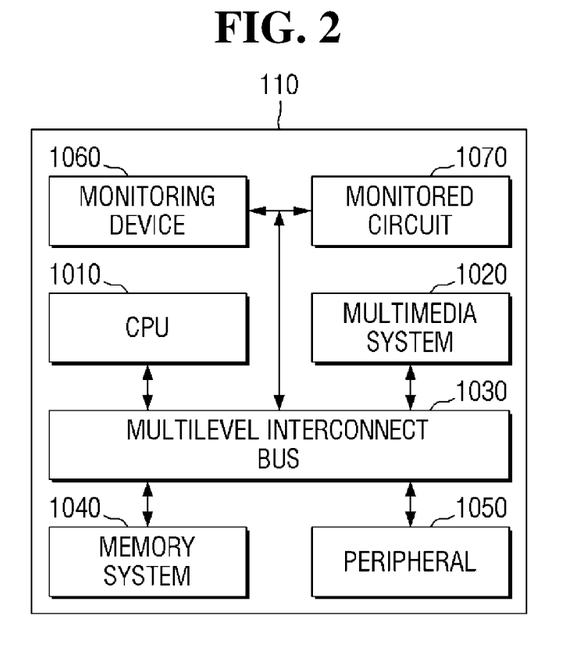
FIG. 2 illustrates a block diagram of a processor of FIG. 1.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts. FIG. 1 illustrates a block diagram of the semiconductor system 10 according to some embodiments of the inventive concepts. FIG. 2 illustrates a block diagram of processor 110 of FIG. 1.

Referring to FIG. 1, the semiconductor system 10 includes the processor 110, a power management integrated circuit (PMIC) 120, a random access memory (RAM) 130, a nonvolatile memory (NVM) 140, a bus 150, a camera 160, and a display 170, but the inventive concepts are not limited thereto. For example, the semiconductor system 10 may include the elements illustrated in FIG. 1, or various modifications can be made to the structure of the semiconductor system 10 using the elements illustrated in FIG. 1.

The processor 110 includes at least one of a central processing unit (CPU), a graphic processing unit (GPU), an application processor (AP), and a communication processor (CP).

In some embodiments, the processor 110 may be for example an AP implemented in a mobile device.

The PMIC 120 may provide operating voltages to, and perform power management on, various elements of the semiconductor system 10, including the processor 110. For example, the PMIC 120 may provide driving voltages (e.g., first and second supply signals SS1 and SS2 of FIG. 3) to the processor 110 and may control the driving voltages as necessary. For example, the PMIC 120 may lower the driving voltages for securing the operating duration of the processor 110 or may stop providing the driving voltages for power saving. In another example, the PMIC 120 may raise the driving voltages for securing the performance of the processor 110.

The RAM 130 may load (i.e., store) therein software that can be executed by the processor 110.

In some embodiments, the RAM 130 may include for example dynamic random access memory (DRAM), static random access memory (SRAM), or the like, but is not limited thereto.

The nonvolatile memory 140 may store various data including data processed by the processor 110. In some embodiments, the nonvolatile memory 140 may include flash memory, but is not limited thereto.

In some embodiments, the semiconductor system 10 may be a smartphone, and may include the camera 160 and the display 170.

The processor 110, the PMIC 120, the RAM 130, the nonvolatile memory 140, the camera 160, and the display 170 are electrically connected to the bus 150 and can thus exchange data with one another.

Referring to FIG. 2, the processor 110 of the semiconductor system 10 includes a central processing unit 1010, a multimedia system 1020, a multilevel interconnect bus 1030, a memory system 1040, a peripheral circuit 1050, a monitoring device 1060, and a monitored circuit 1070.

The central processing unit 1010 may perform operations necessary for driving the semiconductor system 10. In some embodiments, the central processing unit 1010 may be implemented as a multi-core environment including multiple cores.

The multimedia system 1020 may be used to perform various multimedia functions in the semiconductor system 10. The multimedia system 1020 may include for example a three-dimensional (3D) engine module, a video codec, a display system, a camera system, a post-processor, and the like.

The central processing unit 1010, the multimedia system 1020, the memory system 1040, the peripheral circuit 1050, the monitoring device 1060, and the monitored circuit 1070 may communicate data with one another through the multilevel interconnect bus 1030.

In some embodiments, the multilevel interconnect bus 1030 may have a multilevel structure. Specifically, a multilayer advanced high-performance bus (ML-AHB) or a multilayer advanced extensible interface (ML-AXI) may for example be used as the multilevel interconnect bus 1030, but the multilevel interconnect bus 1030 is not limited thereto.

The memory system 1040 may be coupled to an external memory (e.g., a DRAM) to provide an environment for the processor 110 to operate at high speed. In some embodiments, the memory system 1040 may include a separate controller (e.g., a DRAM controller) for controlling an external memory (e.g., a DRAM).

The peripheral circuit 1050 may provide an environment necessary for the semiconductor system 10 to be connected to an external device (e.g., a main board). Accordingly, the peripheral circuit 1050 may have various interfaces compatible with an external device connected to the semiconductor system 10.

The monitoring device 1060 may be a semiconductor device according to some embodiments of the inventive concepts. The monitoring device 1060 may monitor signals (e.g., the second supply signal SS2 of FIG. 3) provided to the monitored 1070.

The monitored circuit 1070 may, for example, be a one-time programmable memory (OTP). The monitored circuit 1070 may, for example, perform operations associated with the security of the semiconductor system 10, but is not limited thereto. Alternatively, the monitored circuit 1070 may be a circuit disposed in the processor 110 to perform arbitrary operations.

The semiconductor device according to embodiments of the inventive concepts and the operation thereof will hereinafter be described with reference to FIGS. 3 through 6. For clarity, description of elements or features that have already been described above will be omitted.

Figure 3:
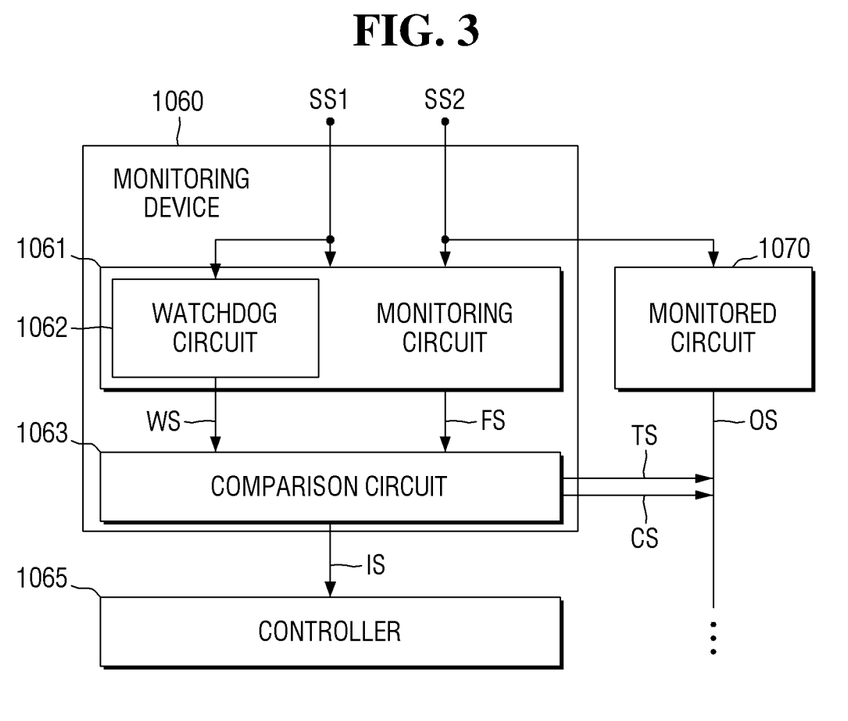
FIG. 3 illustrates a block diagram of a monitoring device, which is a semiconductor device according to embodiments of the inventive concepts.
Figure 4:
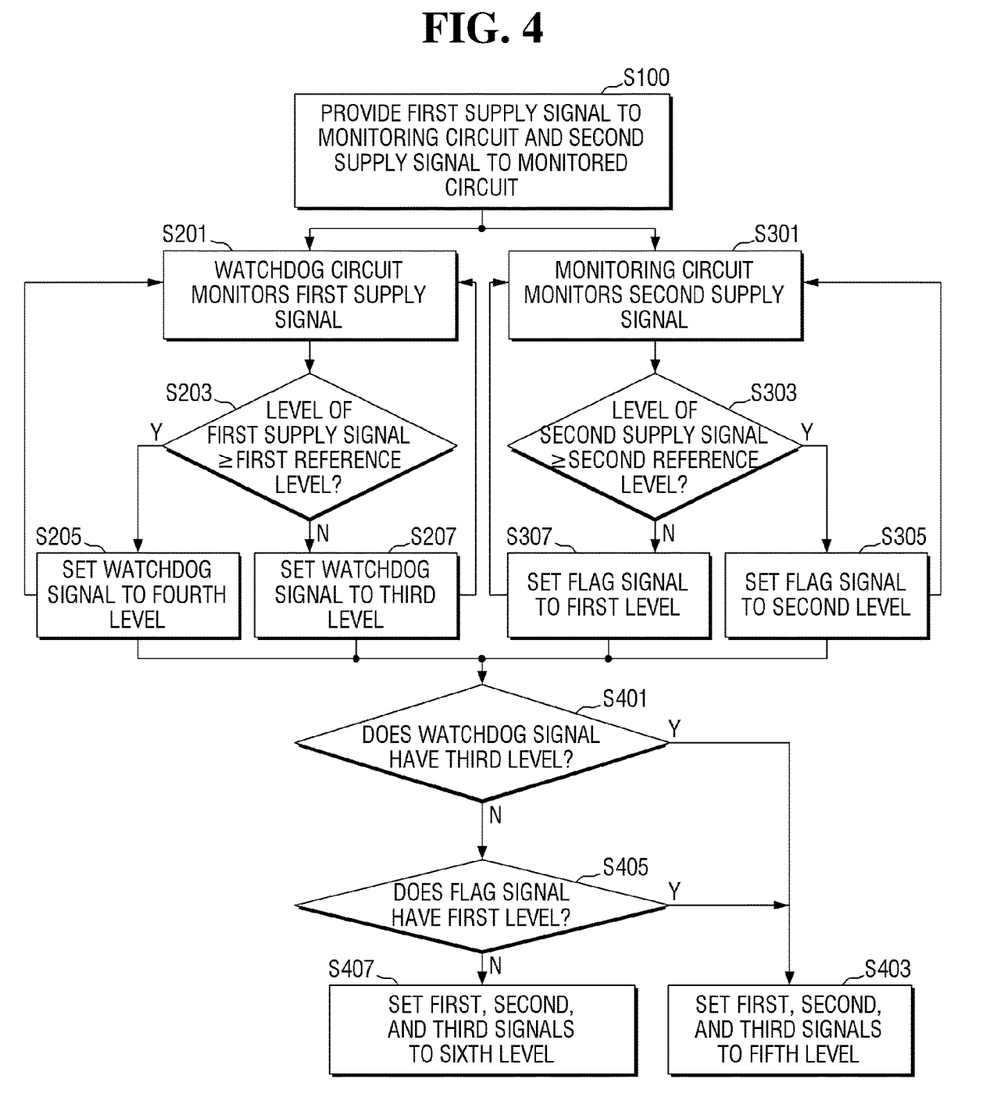
FIG. 4 illustrates a flowchart of an operation of the monitoring device of FIG. 3.
Figure 5:
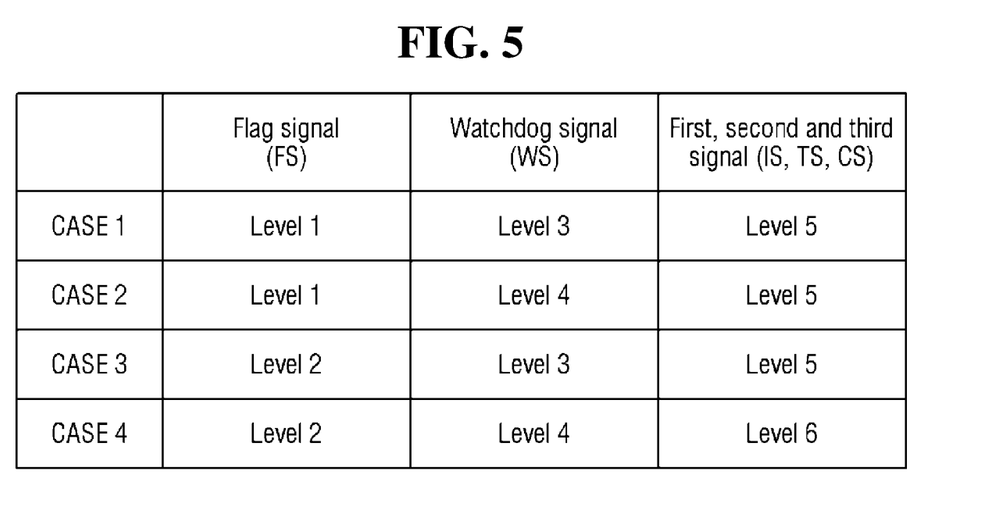
FIG. 5 illustrates a table explanatory of an operation of the monitoring device of FIG. 3.
Figure 6:
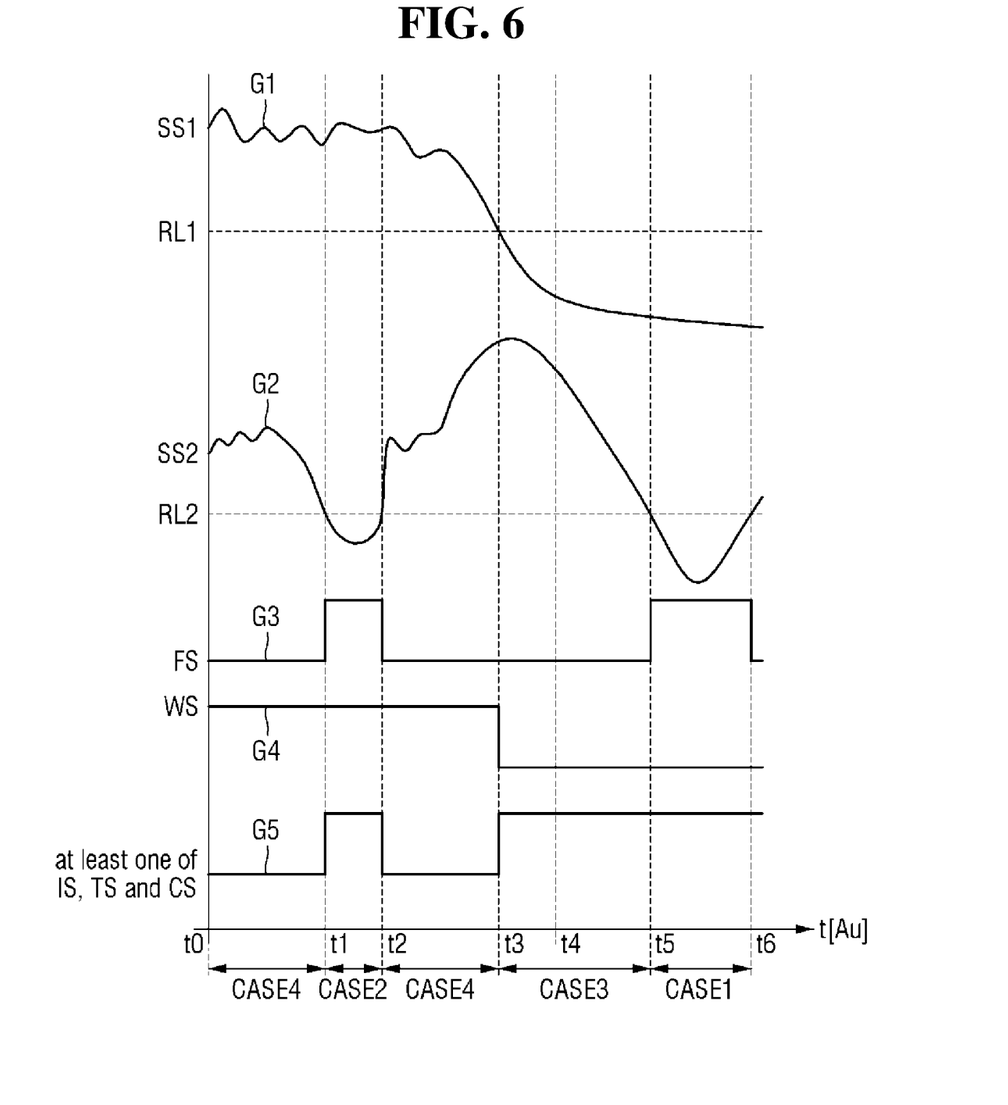
FIG. 6 illustrates graphs explanatory of an operation of the monitoring device of FIG. 3.

FIG. 3 illustrates a block diagram of the monitoring device 1060, which is the semiconductor device according to embodiments of the inventive concepts. FIG. 4 illustrates a flowchart of an operation of the monitoring device 1060. FIG. 5 illustrates a table explanatory of the operation of the monitoring device 1060. FIG. 6 illustrates graphs explanatory of the operation of the monitoring device 1060.

Referring to FIG. 3, the monitoring device 1060, which is the semiconductor device according to some embodiments of the inventive concepts, includes a monitoring circuit 1061, a watchdog circuit 1062, and a comparison circuit 1063. A semiconductor system according to embodiments of the inventive concepts, i.e., the semiconductor system 10 of FIGS. 1 and 2, may include the monitored circuit 1070 and a controller 1065.

The monitoring circuit 1061 may be disposed in the monitoring device 1060. The monitoring circuit 1061 may be provided with the first and second supply signals SS1 and SS2. The monitoring circuit 1061 may, for example, be driven by the first supply signal SS1. The first supply signal SS1 may, for example, be the driving voltage of the monitoring circuit 1061. The monitoring circuit 1061 may monitor the second supply signal SS2. The second supply signal SS2 may be a signal provided to the monitored circuit 1070. The second supply signal SS2 may, for example, be the driving voltage of the monitored circuit 1070.

The monitoring circuit 1061 may monitor the second supply signal SS2 in real time while the first and second supply signals SS1 and SS2, which are driving voltages, are being provided to the monitoring circuit 1061 and the monitored circuit 1070, respectively. The monitoring circuit 1061 may generate a flag signal FS as a result of the monitoring of the second supply signal SS2.

The watchdog circuit 1062 may be disposed in the monitoring circuit 1061. The watchdog circuit 1062 may be provided with the first supply signal SS1. The watchdog circuit 1062 may monitor the first supply signal SS1.

The watchdog circuit 1062 may monitor the first supply signal SS1 in real time while the first supply signal SS1, which is a driving voltage, is being provided to the monitoring circuit 1061. The watchdog circuit 1062 may generate a watchdog signal WS as a result of the monitoring of the first supply signal SS1.

Although shown as generally in the monitoring device 1060, the comparison circuit 1063 may be disposed in the monitoring circuit 1061. The comparison circuit 1063 may receive the flag signal FS and the watchdog signal WS. The comparison circuit 1063 compares the flag signal FS and the watch dog signal WS to determine whether a current condition is a normal condition or an abnormal condition.

The comparison circuit 1063 may generate first, second, and third signals IS, TS, and CS.

In some embodiments, under an abnormal condition, the comparison circuit 1063 may set at least one of the first, second, and third signals IS, TS, and CS to a particular level. Under a normal condition, the comparison circuit 1063 may set at least one of the first, second, and third signals IS, TS, and CS to a different level from its or their level under the abnormal condition. In other words, the comparison circuit 1063 may selectively change the levels of the first, second, and third signals IS, TS, and CS. For example, when the first signal IS needs to be activated when the abnormal condition is established (or detected) while the normal condition is being maintained, the comparison circuit 1063 may activate the first signal IS by setting the first signal IS to a level different from its level under the normal condition. In this example, the levels of the second and third signals TS and CS may not be changed, so that the second and third signals TS and CS may be maintained to be inactive. The normal and abnormal conditions will be described later in detail.

In some embodiments, under the abnormal condition, the comparison circuit 1063 may set the first signal IS to a particular level. Under the normal condition, the comparison circuit 1063 may set the first signal IS to a different level from its level under the abnormal condition. The comparison circuit 1063 may activate at least one of the second and third signals TS and CS based on the level of the first signal IS. For example, if the first signal IS is changed to a particular level when the abnormal condition is established (or detected) while the normal condition is being maintained, the comparison circuit 1063 may change at least one of the second and third signals TS and CS to a different level from its or their level under the normal condition based on the change in the level of the first signal IS. As a result, at least one of the second and third signals TS and CS may be activated. For example, when the first signal IS is switched from a logic low level to a logic high level, the comparison circuit 1063 may activate at least one of the second and third signals TS and CS by setting the corresponding signal(s) to a particular level during a period when the first signal IS has the logic high level.

The first signal IS may, for example, be an interrupt signal. For example, the first signal IS may include information as to whether the monitoring circuit 1061 is operating under the abnormal condition. For example, when the first signal IS is switched from the logic low level to the logic high level, the monitoring circuit 1061 may have determined that the monitoring circuit 1061 is operating under the abnormal condition during the period when the first signal IS has the logic high level.

The first signal IS may be provided to the controller 1065.

The controller 1065 may, for example, be disposed on the outside of the monitoring device 1060, but the inventive concepts are not limited thereto. Alternatively, the controller 1065 may be disposed in the monitoring device 1060. In some embodiments, the controller 1065 may not be provided, in which case, the first signal IS may, for example, be provided to the central processing unit 1010.

The controller 1065 may, for example, resolve an interrupt by processing the first signal IS.

The second signal TS may, for example, be a signal attaching a tag indicating the abnormal condition to an output signal OS of the monitored circuit 1070. For example, the comparison circuit 1063 may not attach the tag to the output signal OS of the monitored circuit 1070 when the second signal TS has the logic low level, i.e., under the abnormal condition. For example, the comparison circuit 1063 may attach the tag to the output signal OS of the monitored circuit 1070 when the second signal TS has the logic high level, i.e., under the abnormal condition.

The monitored circuit 1070 may be disposed, for example, on the outside of the monitoring device 1060, but the inventive concepts are not limited thereto. Alternatively, the monitored circuit 1070 may be disposed in the monitoring device 1060. The monitored circuit 1070 may be provided with the second supply signal SS2 and may output the output signal OS.

The third signal CS may, for example, be a signal changing the output signal OS of the monitored circuit 1070 into a signal whose security is secured (i.e., a secured signal). It is assumed that if the output signal OS of the monitored circuit 1070 is, for example, "0000", the security protection function of the semiconductor system 10 of FIG. 1 is enabled. For example, the comparison circuit 1063 may not change the output signal OS of the monitored circuit 1070 when the third signal CS has the logic low level, i.e., under the normal condition. For example, the comparison circuit 1063 may change the output signal OS to "0000" when the third signal CS has the logic high level, i.e., under the abnormal condition.

In some embodiments, the normal condition may be a case where the first supply signal SS1 drives the monitoring circuit 1061 and has a level that can secure the operation, and the reliability of security, of the monitoring circuit 1061. Also, the normal condition may be a case where the second supply signal SS2 drives the monitored circuit 1070 and has a level that can secure the operation, and the reliability of security, of the monitored circuit 1070.

The abnormal condition may be a case where the first supply signal SS1 has a level that cannot secure the operation of the monitoring circuit 1061 and the reliability of security of the monitoring circuit 1061. Also, the abnormal condition may be a case where the second supply signal SS2 has a level that cannot secure the operation of the monitored circuit 1070 and the reliability of security of the monitored circuit 1070.

A level that cannot secure an operation and the reliability of security may correspond to a case where the level of a voltage supplied to each circuit is lower than a particular level (e.g., a first or second reference level RL1 or RL2 of FIG. 6) and a supply voltage lower than a voltage required during a lower power mode of each circuit is provided to each circuit. A case where the operation, and the reliability of security, of at least one of the monitoring circuit 1061 and the monitored circuit 1070 cannot be secured may, for example, be a case where there exists a malicious attack for weakening the security of at least one of the monitoring circuit 1061 and the monitored circuit 1070.

Referring to FIG. 4, in S100, the first supply signal SS1 is provided to the monitoring circuit 1061, which is the semiconductor device according to embodiments of the inventive concepts. Also, in S100, the second supply signal SS2 is provided to the monitored circuit 1070.

In S201, the watchdog circuit 1062 monitors the first supply signal SS1.

In S203, the watchdog circuit 1062 determines whether the level of the first supply signal SS1 is lower than a first reference level.

In S205, under the normal condition, the watchdog circuit 1062 sets the watchdog signal WS to a fourth level. For example, if the level of the first supply signal SS1 is higher than, or the same as, the first reference level (Yes (Y) in S203), the watchdog circuit 1062 determines that the current condition is the normal condition. Then, the watchdog circuit 1062 sets the level of the watchdog signal WS to the fourth level in S205 and continues to monitor the first supply signal SS1 in S201 while the first supply signal SS1 is being provided to the watchdog circuit 1062.

In S207, under the abnormal condition, the watchdog circuit 1062 sets the watchdog signal WS to a third level. For example, if the level of the first supply signal SS1 is lower than the first reference level (No (N) in S203), the watchdog circuit 1062 determines that the current condition is the abnormal condition. Then, the watchdog circuit 1062 sets the level of the watchdog signal WS to the third level in S207 and continues to monitor the first supply signal SS1 in S201 while the first supply signal SS1 is being provided to the watchdog circuit 1062.

For example, if the third level is a logic low level 0, the fourth level may be a logic high level 1. Alternatively, if the third level is the logic high level 1, the fourth level may be the logic low level 0.

In S301, the monitoring circuit 1061 monitors the second supply signal SS2.

In S303, the monitoring circuit 1061 determines whether the level of the second supply signal SS2 is lower than a second reference level.

In S305, under the normal condition, the monitoring circuit 1061 sets the flag signal FS to a second level. For example, if the level of the second supply signal SS2 is higher than, or the same as, the second reference level (Yes (Y) in S303), the monitoring circuit 1061 determines that the current condition is the normal condition. Then, the monitoring circuit 1061 sets the level of the flag signal FS to the second level in S305 and continues to monitor the second supply signal SS2 in S301 while the second supply signal SS2 is being provided to the monitored circuit 1070.

In S307, under the abnormal condition, the monitoring circuit 1061 sets the flag signal FS to a first level. For example, if the level of the second supply signal SS2 is lower than the second reference level (No (N) in S303), the monitoring circuit 1061 determines that the current condition is the abnormal condition. Then, the monitoring circuit 1061 sets the level of the flag signal FS to the first level in S307 and continues to monitor the second supply signal SS2 in S301 while the second supply signal SS2 is being provided to the monitored circuit 1070.

For example, if the first level is the logic high level 1, the second level is the logic low level 0. Alternatively, if the first level is the logic low level 0, the second level is the logic high level 1.

In S401, S403, S405, and S407, the comparison circuit 1063 sets the level of at least one of the first, second, and third signals IS, TS, and CS based on the levels of the watchdog signal WS and the flag signal FS.

For example, in S401, the comparison circuit 1063 determines whether the watchdog signal WS has the third level.

If the watchdog signal WS has the third level (Yes (Y) in S401), in S403 the comparison circuit 1063 determine that the current condition is the abnormal condition and sets at least one of the first, second, and third signals IS, TS, and CS to a fifth level. In other words, if the watchdog signal WS has the third level, the comparison circuit 1063 sets at least one of the first, second, and third signals IS, TS, and CS to the fifth level regardless of the level of the flag signal FS.

If the watchdog signal WS does not have the third level (No (N) in S401), the comparison circuit 1063 determines whether the flag signal FS has the first level.

If the flag signal FS has the first level (Yes (Y) in S401), in S403 the comparison circuit 1063 determines that the current condition is the abnormal condition and sets at least one of the first, second, and third signals IS, TS, and CS to the fifth level. In other words, if the flag signal FS has the first level, the comparison circuit 1063 sets at least one of the first, second, and third signals IS, TS, and CS to the fifth level, even if the watchdog signal WS has the fourth level.

If the flag signal FS does not have the first level (No (N) in S405), the comparison circuit 1063 determines that the current condition is the normal condition and sets at least one of the first, second, and third signals IS, TS, and CS to a sixth level.

In short, if the watchdog signal WS has the third level, the comparison circuit 1063 determines that the current condition is the abnormal condition, regardless of the level of the flag signal FS. Also, if the flag signal FS has the first level, the comparison circuit 1063 determines that the current condition is the abnormal condition, regardless of the level of the watchdog signal WS.

For example, if the fifth level is the logic high level 1, the sixth level is the logic low level 0. Alternatively, if the fifth level is the logic low level 0, the sixth level is the logic high level 1.

The operations of the monitoring circuit 1061, the watchdog circuit 1062, and the comparison circuit 1063 will hereinafter be described in further detail with reference to FIGS. 5 and 6.

Referring to FIG. 6, the X axis for first through fifth graphs G1 through G5 represent time (in arbitrary units (AUs)). The Y axis for the first and second graphs G1 and G2 may represent voltage. The Y axis for the third through fifth graphs G3 through G5 may represent logic level.

Referring to FIGS. 5 and 6, a period from t0 to t1 may correspond to "CASE 4" of FIG. 5.

For example, during the period from t0 to t1, the level of the first supply signal SS1 is higher than the first reference level RL1, as indicated by the first graph G1, which shows the level of the first supply signal SS1. Accordingly, the watchdog circuit 1062 determines that the period from t0 to t1 is under the normal condition and sets the watchdog signal WS to a fourth level "Level 4". In other words, during the period from t0 to t1, the watchdog signal WS has the fourth level "Level 4", e.g., a logic high level, as indicated by the fourth graph G4, which shows the level of the watchdog signal WS.

The first reference level RL1 may be a reference direct current (DC) voltage set by the watchdog circuit 1062. For example, the first reference level RL1 is not a voltage supplied from the outside of the watchdog circuit 1062.

For example, during the period from t0 to t1, the level of the second supply signal SS2 is higher than the second reference level RL2, as indicated by the second graph G2, which shows the level of the second supply signal SS2. Accordingly, the monitoring circuit 1061 determines that the period from t0 to t1 is under the normal condition and sets the flag signal FS to a second level "Level 2". In other words, during the period from t0 to t1, the flag signal FS has the second level "Level 2", e.g., a logic low level, as indicated by the third graph G3, which shows the level of the flag signal FS.

The second reference level RL2 may be a reference DC voltage set by the monitoring circuit 1061. For example, the second reference level RL2 is not a voltage supplied from the outside of the monitoring circuit 1061.

For example, during the period from t0 to t1, the comparison circuit 1063 sets at least one of the first, second, and third signals IS, TS, and CS to a sixth level "Level 6". In other words, since during the period from t0 to t1, the watchdog signal WS has the fourth level "Level 4" and the flag signal FS has the second level "Level 2", the comparison circuit 1063 determines that the current condition is the normal condition. Accordingly, the comparison circuit 1063 sets at least one of the first, second, and third signals IS, TS, and CS to the sixth level "Level 6", e.g., the logic low level.

A period from t1 to t2 may correspond to "CASE 2" of FIG. 5.

For example, during the period from t1 to t2, the level of the first supply signal SS1 is higher than the first reference level RL1, as indicated by the first graph G1. Accordingly, the watchdog circuit 1062 determines that the period from t1 to t2 is under the normal condition and sets the watchdog signal WS to the fourth level "Level 4". In other words, during the period from t1 to t2, the watchdog signal WS has the fourth level "Level 4", e.g., the logic high level, as indicated by the fourth graph G4.

For example, during the period from t1 to t2, the level of the second supply signal SS2 is lower than the second reference level RL2, as indicated by the second graph G2. Accordingly, the monitoring circuit 1061 determines that the period from t1 to t2 is under the abnormal condition and sets the flag signal FS to a first level "Level 1". In other words, during the period from t1 to t2, the flag signal FS has the first level "Level 1", e.g., the logic high level, as indicated by the third graph G3.

For example, during the period from t1 to t2, the comparison circuit 1063 sets at least one of the first, second, and third signals IS, TS, and CS to a fifth level "Level 5" regardless of the level of the watchdog signal WS. In other words, since during the period from t1 to t2, the watchdog signal WS has the fourth level "Level 4" and the flag signal FS has the first level "Level 1", the comparison circuit 1063 may determine that the current condition is the abnormal condition. Accordingly, the comparison circuit 1063 may set at least one of the first, second, and third signals IS, TS, and CS to the fifth level "Level 5", e.g., the logic high level.

A period from t3 to t5 may correspond to "CASE 3" of FIG. 5.

For example, during the period from t3 to t5, the level of the first supply signal SS1 is lower than the first reference level RL1, as indicated by the first graph G1. Accordingly, the watchdog circuit 1062 determines that the period from t3 to t5 is under the abnormal condition and sets the watchdog signal WS to the third level "Level 3". In other words, during the period from t3 to t5, the watchdog signal WS has the third level "Level 3", e.g., the logic low level, as indicated by the fourth graph G4.

For example, during the period from t3 to t5, the level of the second supply signal SS2 is higher than the second reference level RL2, as indicated by the second graph G2. Accordingly, the monitoring circuit 1061 determines that the period from t3 to t5 is under the normal condition and sets the flag signal FS to the second level "Level 2". In other words, during the period from t3 to t5, the flag signal FS has the second level "Level 2", e.g., the logic low level, as indicated by the third graph G3.

For example, during the period from t3 to t5, the comparison circuit 1063 sets at least one of the first, second, and third signals IS, TS, and CS to the fifth level "Level 5". In other words, since during the period from t3 to t5, the watchdog signal WS has the third level "Level 3" and the flag signal FS has the second level "Level 2", the comparison circuit 1063 determines that the current condition is the abnormal condition. Accordingly, the comparison circuit 1063 sets at least one of the first, second, and third signals IS, TS, and CS to the fifth level "Level 5", e.g., the logic high level.

A period from t5 to t6 may correspond to "CASE 1" of FIG. 5.

For example, during the period from t5 to t6, the level of the first supply signal SS1 is lower than the first reference level RL1, as indicated by the first graph G1. Accordingly, the watchdog circuit 1062 determines that the period from t5 to t6 is under the abnormal condition and sets the watchdog signal WS to the third level "Level 3". In other words, during the period from t5 to t6, the watchdog signal WS has the third level "Level 3", e.g., the logic low level, as indicated by the fourth graph G4.

For example, during the period from t5 to t6, the level of the second supply signal SS2 is lower than the second reference level RL2, as indicated by the second graph G2. Accordingly, the monitoring circuit 1061 determines that the period from t5 to t6 is under the abnormal condition and sets the flag signal FS to the first level "Level 1". In other words, during the period from t5 to t6, the flag signal FS has the first level "Level 1", e.g., the logic high level, as indicated by the third graph G3.

For example, during the period from t5 to t6, the comparison circuit 1063 sets at least one of the first, second, and third signals IS, TS, and CS to the fifth level "Level 5". In other words, since during the period from t5 to t6, the watchdog signal WS has the third level "Level 3" and the flag signal FS has the first level "Level 1", the comparison circuit 1063 determines that the current condition is the abnormal condition. Accordingly, the comparison circuit 1063 sets at least one of the first, second, and third signals IS, TS, and CS to the fifth level "Level 5", e.g., the logic high level.

The semiconductor device according to embodiments of the inventive concepts, i.e., the monitoring device 1060, includes the watchdog circuit 1062, and monitors not only the second supply signal SS2 provided to the monitored circuit 1070, but also the first supply signal SS1 provided to the monitoring circuit 1061 that monitors the second supply signal SS2, and can thus secure the operation, and the reliability of security, of the monitored circuit 1070 and the operation, and the reliability of security, of the monitoring circuit 1061. Also, since the watchdog circuit 1062 is additionally disposed in the monitoring circuit 1061, the monitoring device 1060 can detect any decrease in the reliability of the monitoring circuit 1061.

A semiconductor system 20 according to embodiments of the inventive concepts will hereinafter be described with reference to FIGS. 7 and 8. For clarity, description of like elements or features that have already been described above will be omitted.

Figure 7:
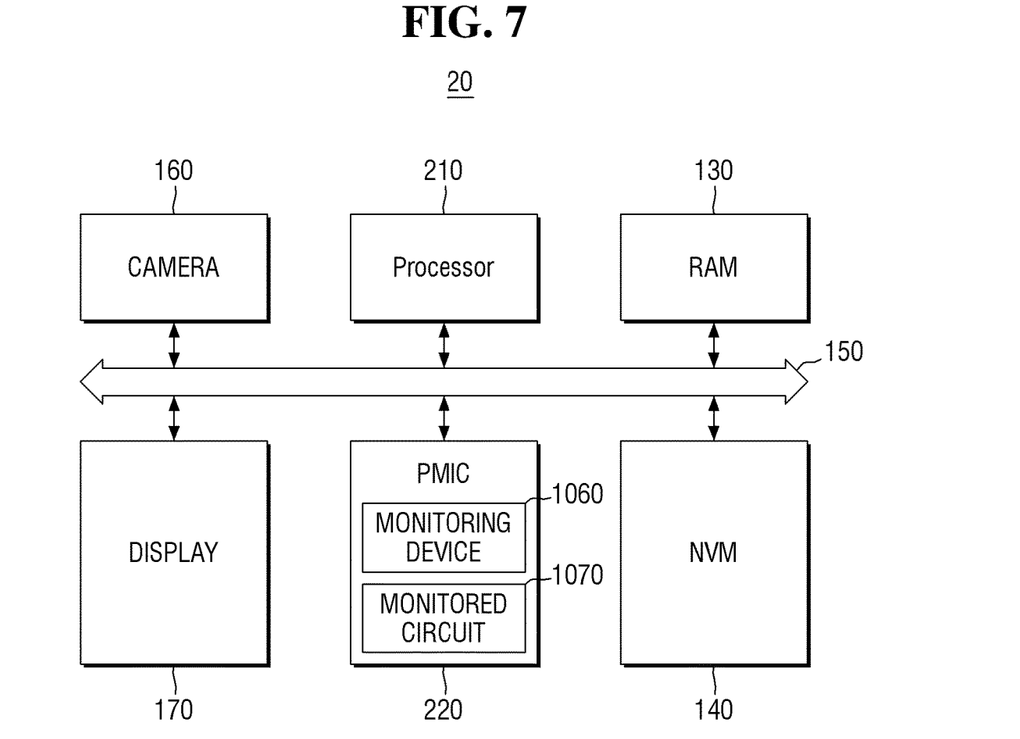
FIG. 7 illustrates a block diagram of a semiconductor system according to embodiments of the inventive concepts.

FIG. 7 illustrates a block diagram of the semiconductor system 20. FIG. 8 illustrates a block diagram illustrating a processor 210 and a PMIC 220 of FIG. 7.

Figure 8:
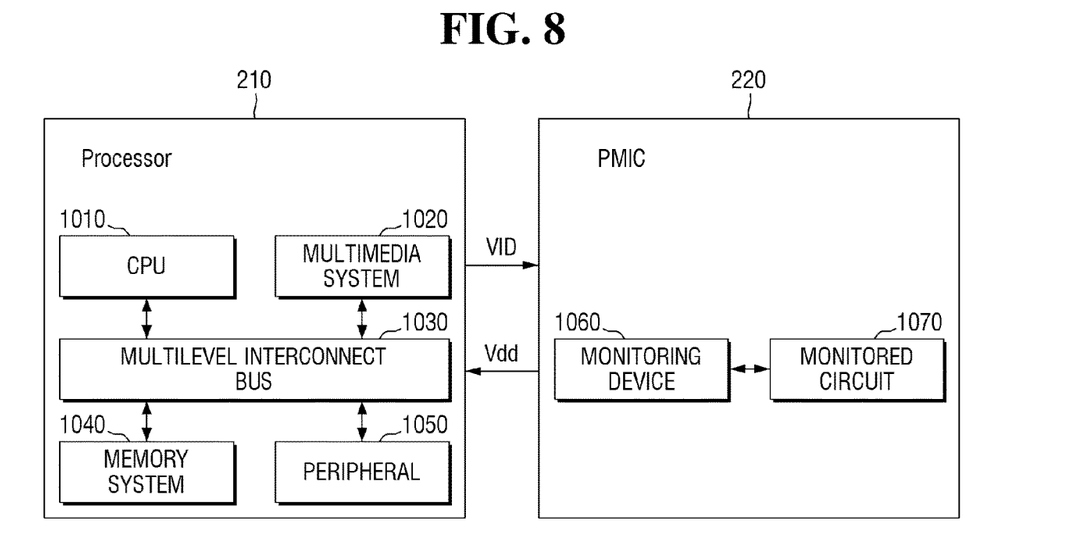
FIG. 8 illustrates a block diagram of a processor and a power management integrated circuit (PMIC) of FIG. 7.

Referring to FIGS. 7 and 8, the monitoring device 1060, which is the semiconductor device according to embodiments of the inventive concepts, is disposed in the PMIC 220. The first and second supply signals SS1 and SS2 of FIG. 3 are provided to the PMIC 220.

The monitored circuit 1070 is, for example, a circuit disposed in the PMIC 220 to perform particular functions.

A controller, such as controller 1065 described above with reference to FIGS. 3 through 6, although not shown in FIGS. 7 and 8, may for example be disposed inside or outside the PMIC 220. Moreover, as mentioned previously, the controller such as controller 1065 may not be provided.

The processor 210 is supplied with power by the PMIC 220. For example, the processor 210 may send a request for a driving voltage Vdd to the PMIC 220. For example, the processor 210 may send a voltage code VID for requesting the driving voltage Vdd to the PMIC 220, and in response to the receipt of the voltage code VID, the PMIC 220 may provide the driving voltage Vdd to the processor 210.

A semiconductor system 30 according to embodiments of the inventive concepts will hereinafter be described with reference to FIGS. 9 through 11. For clarity, description of like elements or features that have already been described above will be omitted.

Figure 9:
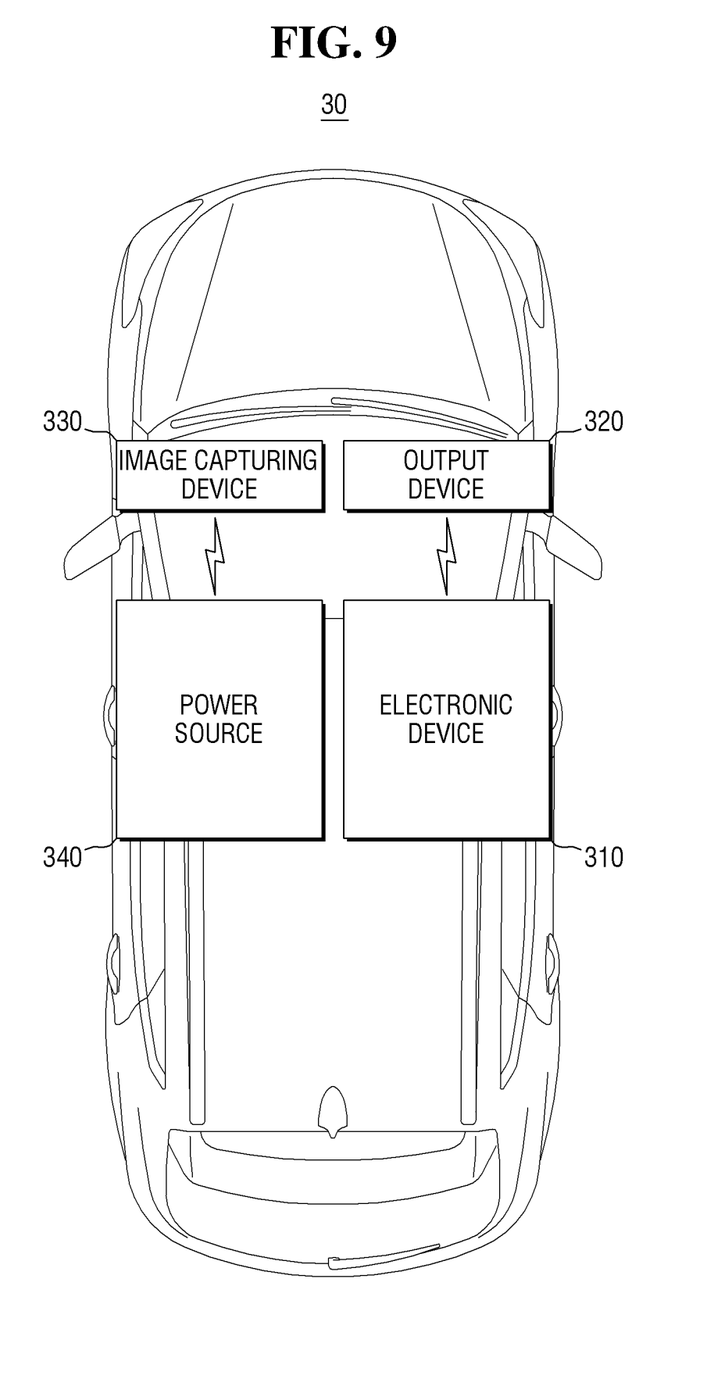
FIG. 9 illustrates a schematic view of a semiconductor system according to embodiments of the inventive concepts.

FIG. 9 illustrates a schematic view of the semiconductor system 30. FIG. 10 illustrates a block diagram of an electronic device 310 of FIG. 9. FIG. 11 illustrates a block diagram of a processor 311 for an automobile of FIG. 10.

Figure 10:
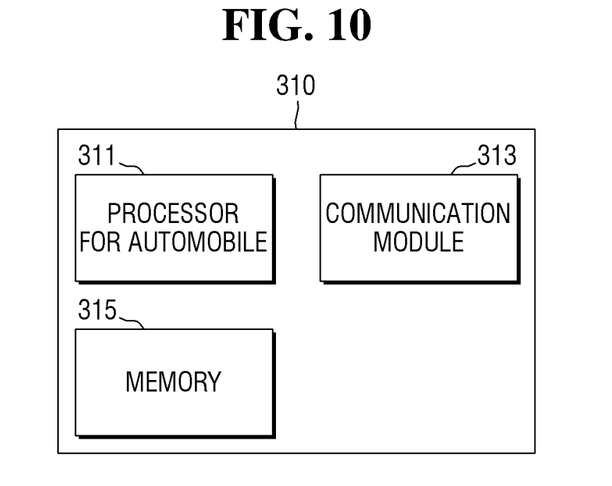
FIG. 10 illustrates a block diagram of an electronic device of FIG. 9.

Referring to FIGS. 9 and 10, the semiconductor system 30 may be an automobile. The semiconductor system 30 includes, for example, the electronic device 310, an output device 320, an image capturing device 330, and a power source 340, but is not limited thereto. For example, the semiconductor system 30 may include the elements illustrated in FIG. 9, or various modifications may be made to the structure of the semiconductor system 30 using the elements illustrated in FIG. 9.

The electronic device 310 may, for example, control the output device 320, the image capturing device 330, and the power source 340. The electronic device 310 may include the processor 311 for an automobile, a communication module 313, and a memory 315 as shown in FIG. 10.

The processor 311 for an automobile may perform operations associated with the control and/or the communication of at least one element of the electronic device 310 or may perform data processing. The processor 311 for an automobile may, for example, receive input data from the image capturing device 330 and process the input data. The processor 311 for an automobile may, for example, perform particular functions using data stored in the memory 315.

The communication module 313 may, for example, communicate with an external device (e.g., the image capturing device 330 and/or the output device 320) via wireless or wired communication.

The memory 315 may store data output by each element of the electronic device 310 or models for performing particular operations.

The output device 320 may perform an operation in accordance with data or a command output by the electronic device 310. The output device 320 may, for example, include a lighting device, an alarm device, and/or a braking device.

The image capturing device 330 may capture an image of the surroundings of the semiconductor system 30. The image capturing device 330 may include for example a 3D camera, a digital camera, a video camera, a thermal camera, a night vision camera, an infrared (IR) camera, an X-ray camera, a sensor, or a combination thereof. The image capturing device 330 may include an analog-to-digital converter (ADC) capable of converting an input image into a digital signal. The image capturing device 330 may further include a communication module to transmit input to an external device (e.g., the electronic device 310).

The power source 340 may, for example, transmit power to the semiconductor system 30. The power source 340 may, for example, be controlled by the electronic device 310. The power source 340 may include, for example, an engine control device, a crank mechanism, an engine lubrication device, an exhaust device, or the like.

Figure 11:
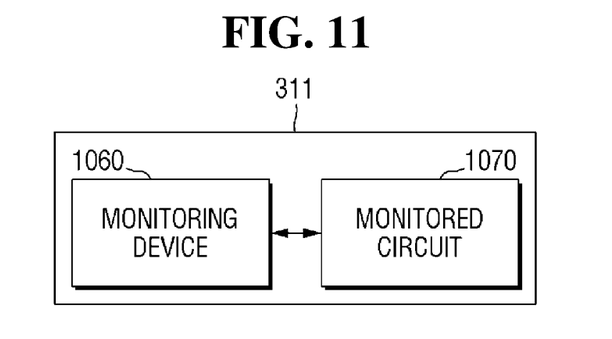
FIG. 11 illustrates a block diagram of a processor for an automobile of FIG. 10.

Referring to FIG. 11, the processor 311 for an automobile may include a monitoring device 1060, which is as described above with reference to FIGS. 3 through 6.

The monitoring device 1060 may be disposed in the processor 311 for an automobile. The first and second supply signals SS1 and SS2 of FIG. 3 may be provided to the processor 311 for an automobile.

A monitored circuit 1070 may, for example, be disposed in the processor 311 for an automobile to perform an operation associated with the security of the semiconductor system 30. Alternatively, the monitored circuit 1070 may, for example, be disposed in the processor 311 for an automobile to perform an operation associated with the safety of the semiconductor system 30. However, the inventive concepts are not limited to these examples. Still alternatively, the monitored circuit 1070 may be a circuit disposed in the processor 311 for an automobile to perform an arbitrary operation.

The controller such as controller 1065 may, for example, be disposed inside or outside the processor 311 for an automobile. As already mentioned above, the controller such as controller 1065 may not be provided.

In a software implementation, embodiments of the inventive concepts such as procedures or functions described herein may be implemented by separate software modules. Each software module may perform one or more functions or operations described herein. Software codes may be implemented by a software application written in any suitable programming language.

While the inventive concepts have been particularly shown and described with reference to exemplary embodiments thereof, it should be understood by those of ordinary skill in the art that various changes in form and detail may be made therein without departing from the spirit and scope of the inventive concepts as defined by the following claims. It is therefore desired that the embodiments be considered in all respects as illustrative and not restrictive, reference being made to the appended claims rather than the foregoing description to indicate the scope of the inventive concepts.

What is claimed is:

1. A semiconductor device comprising:
a monitoring circuit configured to receive a first supply signal and generate a flag signal by monitoring a second supply signal provided to a monitored circuit;
a watchdog circuit disposed in the monitoring circuit, and configured to receive the first supply signal and generate a watchdog signal; and
a comparison circuit configured to receive the flag signal and the watchdog signal and generate a first signal which has a first level under an abnormal condition and a second level under a normal condition, wherein the second level is different than the first level,
wherein the watchdog circuit is configured to set the watchdog signal to a third level when a level of the first supply signal is lower than a first reference level, and when the watchdog signal has the third level, the comparison circuit is configured to allow the first signal to have the first level regardless of a level of the flag signal.

2. The semiconductor device of claim 1, wherein the watchdog circuit is configured to set the watchdog signal to a fourth level when the level of the first supply signal is higher than or the same as the first reference level, and
the monitoring circuit is configured to set the flag signal to a fifth level when a level of the second supply signal is lower than a second reference level, and set the flag signal to a sixth level when the level of the second supply signal is higher than or the same as the second reference level, wherein the sixth level is different than the fifth level.

3. The semiconductor device of claim 2, wherein the abnormal condition is a case when the flag signal has either one of the fifth and sixth levels and the watchdog signal has the third level, and
the normal condition is a case when the flag signal has the sixth level and the watchdog signal has the fourth level.

4. The semiconductor device of claim 3, wherein when the flag signal has the fifth level, the comparison circuit is configured to allow the first signal to have the first level regardless of a level of the watchdog signal.

5. The semiconductor device of claim 1, wherein the first supply signal is a driving voltage of the monitoring circuit, and the second supply signal is a driving voltage of the monitored circuit.

6. The semiconductor device of claim 1, wherein the watchdog circuit is configured to monitor the first supply signal in real time and generate the watchdog signal, while the first supply signal is being provided to the monitoring circuit.

7. The semiconductor device of claim 1, wherein the monitored circuit is disposed outside the semiconductor device.

8. A semiconductor system comprising:
a processor receiving first and second supply signals; and
a monitored circuit disposed in the processor and driven by the second supply signal,
wherein the processor is configured to monitor the first supply signal and generate a watchdog signal having a first level when a level of the first supply signal is lower than a first reference level, monitor the second supply signal and generate a flag signal, and generate an interrupt signal regardless of a level of the flag signal when the watchdog signal has the first level.

9. The semiconductor system of claim 8, wherein the watchdog signal has a second level when the level of the first supply signal is higher than or the same as the first reference level, wherein the second level is different than the first level.

10. The semiconductor system of claim 9, wherein the flag signal has a third level when a level of the second supply signal is lower than a second reference level, and has a fourth level when the level of the second supply signal is higher than or the same as the second reference level, wherein the fourth level is different than the third level.

11. The semiconductor system of claim 10, wherein the processor is configured to generate the interrupt signal when the watchdog signal has the second level and the flag signal has the third level.

12. The semiconductor system of claim 8, wherein the processor is an application processor.

13. The semiconductor system of claim 8, wherein the processor is configured to monitor the first supply signal in real time and generate the watchdog signal, while the first supply signal is being provided.

14. The semiconductor system of claim 8, wherein the processor comprises:
a monitoring circuit disposed in the processor and driven by the first supply signal, and configured to generate the flag signal; and
a watchdog circuit configured to monitor the first supply signal and generate the watchdog signal,
wherein the watchdog circuit is disposed in the monitoring circuit.

15. A semiconductor system comprising:
a semiconductor device receiving a first supply signal; and
a monitored circuit receiving a second supply signal, wherein the semiconductor device comprises
- a monitoring circuit driven by the first supply signal and configured to generate a flag signal by monitoring the second supply signal,
- a watchdog circuit configured to generate a watchdog signal having a first level when a level of the first supply signal is lower than a first reference level, and
- a comparison circuit configured to determine that a current condition is an abnormal condition regardless of a level of the flag signal when the watchdog signal has the first level.

16. The semiconductor system of claim 15, wherein the watchdog circuit is configured to set the watchdog signal to a second level when the level of the first supply signal is higher than or the same as the first reference level, and
the monitoring circuit is configured to set the flag signal to a third level when a level of the second supply signal is lower than a second reference level, and set the flag signal to a fourth level when the level of the second supply signal is higher than or the same as the second reference level, wherein the fourth level is different than the third level.

17. The semiconductor system of claim 16, wherein the comparison circuit is configured to determine that the current condition is a normal condition when the flag signal has the fourth level and the watchdog signal has the second level, and
the abnormal condition includes a case when the flag signal has either one of the third and fourth levels and the watchdog signal has the first level, and a case when the watchdog signal has the second level and the flag signal has the third level.

18. The semiconductor system of claim 15, wherein the watchdog circuit is disposed in the monitoring circuit.

19. The semiconductor system of claim 15, further comprising:
- an application processor,
  wherein the semiconductor device and the monitored circuit are disposed in the application processor.

20. The semiconductor system of claim 15, further comprising:
- a power management integrated circuit; and
- an application processor receiving power from the power management integrated circuit,
  wherein the semiconductor device and the monitored circuit are disposed in the power management integrated circuit.

* * * * *